United States Patent
Ruwe et al.

(10) Patent No.: US 11,835,409 B2
(45) Date of Patent: Dec. 5, 2023

(54) PRESSURE MONITORING USING A HYBRID PRESSURE SWITCH

(71) Applicant: Honeywell International Inc., Morris Plains, NJ (US)

(72) Inventors: Christian Ruwe, Mettingen (DE); Thomas Lampe, Ibbenbüren (DE); Tobias Otterpohl, Lotte (DE); Thomas Heyen, Osnabrück (DE); David Kucera, Bilovice nad Svitavou (CZ)

(73) Assignee: Honeywell International Inc., Charlotte, NC (US)

( * ) Notice: Subject to any disclaimer, the term of this patent is extended or adjusted under 35 U.S.C. 154(b) by 410 days.

(21) Appl. No.: 17/134,319

(22) Filed: Dec. 26, 2020

(65) Prior Publication Data

US 2022/0205859 A1    Jun. 30, 2022

(51) Int. Cl.
  *G01L 19/14*    (2006.01)
  *H01H 9/00*    (2006.01)

(52) U.S. Cl.
  CPC ............ *G01L 19/14* (2013.01); *H01H 9/00* (2013.01)

(58) Field of Classification Search
  None
  See application file for complete search history.

(56) References Cited

U.S. PATENT DOCUMENTS

| | | | |
|---|---|---|---|
| 4,576,049 A | 3/1986 | Kohnlechner | |
| 5,292,232 A * | 3/1994 | Krohn | H01H 35/38 200/82 C |
| 5,296,659 A * | 3/1994 | Potts | H01H 35/34 280/736 |
| 6,774,509 B2 * | 8/2004 | Chu | H01C 10/12 200/341 |
| 7,071,832 B2 | 7/2006 | Miyamoto et al. | |
| 7,322,246 B2 | 1/2008 | Miller | |

(Continued)

FOREIGN PATENT DOCUMENTS

| | | |
|---|---|---|
| DE | 3313261 A1 | 10/1984 |
| DE | 10247167 A1 | 4/2004 |

(Continued)

OTHER PUBLICATIONS

European search Report for corresponding EP Application No. 21215822.4.

(Continued)

*Primary Examiner* — Peter J Macchiarolo
*Assistant Examiner* — Jermaine L Jenkins
(74) *Attorney, Agent, or Firm* — Ortiz & Lopez, PLLC; Kermit D. Lopez; Luis M. Ortiz (57) ABSTRACT

A pressure sensor apparatus and a method of operating the pressure sensor apparatus can include a hybrid pressure switch having a single switching point, the hybrid pressure switch comprising: a mechanical pressure switch; and an electronic pressure sensor, wherein the hybrid pressure switch monitors a media pressure with the mechanical pressure switch providing a switching function and the electronic pressure sensor providing a continuous pressure measurement with respect to the media pressure based on a continuous pressure output signal. The switching function can comprise a fail-safe switching function or a non-fail-safe switching function.

20 Claims, 4 Drawing Sheets

Pressure Sensor Apparatus 100
  Hybrid Pressure Switch 102
    Mechanical Pressure Switch 104
    Electronic Pressure Sensor 106

(56) References Cited

U.S. PATENT DOCUMENTS

| | | | | |
|---|---|---|---|---|
| 7,718,907 | B2* | 5/2010 | Wildman | H01H 35/343 |
| | | | | 200/83 Q |
| 8,710,386 | B2* | 4/2014 | Tavilla | H01H 35/28 |
| | | | | 200/83 P |
| 8,809,707 | B2* | 8/2014 | Wildman | F04B 49/022 |
| | | | | 200/81 R |
| 9,645,036 | B2 | 5/2017 | Hung | |
| 10,253,981 | B2 | 4/2019 | Kowald et al. | |

FOREIGN PATENT DOCUMENTS

| | | |
|---|---|---|
| DE | 102011050004 A1 | 10/2012 |
| DE | 102011053152 A1 | 2/2013 |
| DE | 102011000113 B4 | 8/2013 |
| DE | 102014012223 A1 | 2/2015 |
| DE | 202018100708 U1 | 2/2018 |
| EP | 2423656 A1 | 2/2012 |
| JP | 2019060571 A | 4/2019 |

OTHER PUBLICATIONS

"Pressure switch", Wikipedia, Retrieved from "https://en.wikipedia.org/w/index.php? title=Pressure_switch&oldid=971434498", page was last edited on Aug. 6, 2020, at 03:42 (UTC).

"Pressure sensor", Wikipedia, Retrieved from "https://en.wikipedia.org/w/index.php? title=Pressure_sensor&oldid=979630463", page was last edited on Sep. 21, 2020, at 20:48 (UTC).

"Honeywell C6097 pressure switches for gas", https://thermalsolutions.honeywell.com/us/en/products/by-category, downloaded Oct. 24, 2020.

\* cited by examiner

PRESSURE MONITORING USING A HYBRID PRESSURE SWITCH

TECHNICAL FIELD

Embodiments relate to the measurement and monitoring of media pressure. Embodiments further relate to pressure switches utilized for monitoring pressure differences. Embodiments further relate to hybrid pressure switches and pressure sensors.

BACKGROUND

Sensors, such as pressure and flow sensors, are often used to sense the pressure and/or flow of a media (e.g. gas or liquid) in a fluid channel. Such sensors are commonly used in a wide variety of applications including, for example, medical applications, flight control applications, industrial process applications, combustion control applications, weather monitoring applications, water metering applications, as well as many other applications.

In industrial process control operations such as in manufacturing plants and hydrocarbon processing facilities, sensors for sensing physical measurements for the process being run (e.g., pressure, temperature, motion, fluid level, fluid flow, etc.) and instruments performing control output actions (e.g., control valves, actuators, or drive units) for the processing units in the industrial process control environment may be located across a large geographic area. These instruments are generally referred to as "field devices" or "field instruments" (hereafter "field devices") and can include various types of sensors.

Contemporary field devices are generally termed "smart" field devices because these devices can provide valuable asset data besides the basic sensor or control function for a physical parameter. Smart field devices may include sensors such as pressure sensors, which are widely used in industrial processing facilities for the detection of pressure in a process flow control environment.

The measurement and monitoring of media pressures play a major role in many process engineering environments. In addition to suitable switching elements (e.g., pressure switches) pressure sensors are increasingly being used to monitor even the smallest pressure differences.

Frequently, pressure switches may be used for pressure monitoring. These pressure switches can interrupt a safety signal of the higher-level control when a set pressure value is exceeded or not reached. This immediately terminates and switches off such a process engineering process.

This principle is characterized mainly by its simplicity and robustness. A disadvantage of this approach, is that in an abrupt shutdown in many cases, the process material discarded and the process must be restarted.

BRIEF SUMMARY

The following summary is provided to facilitate an understanding of some of the features of the disclosed embodiments and is not intended to be a full description. A full appreciation of the various aspects of the embodiments disclosed herein can be gained by taking the specification, claims, drawings, and abstract as a whole.

It is, therefore, one aspect of the disclosed embodiments to provide for an improved pressure sensor apparatus and varying methods for operating the pressure sensor apparatus.

It is another aspect of the disclosed embodiments to provide for a hybrid pressure switch having one switching point.

It is a further aspect of the disclosed embodiments to provide for a hybrid pressure switching that includes at least a mechanical pressure switch and an electronic pressure sensor combined into a single sensing device.

The aforementioned aspects and other objectives can now be achieved as described herein. In an embodiment, a pressure sensor apparatus can include a hybrid pressure switch having a single switching point, the hybrid pressure switch comprising: a mechanical pressure switch; and an electronic pressure sensor, wherein the hybrid pressure switch monitors a media pressure with the mechanical pressure switch providing a switching function and the electronic pressure sensor providing a continuous pressure measurement with respect to the media pressure based on a continuous pressure output signal.

In an embodiment, the switching function can comprise a fail-safe switching function or a non-fail-safe switching function.

In an embodiment, a housing can be provided with the hybrid pressure switch located within the housing.

In an embodiment, the continuous pressure output signal can be output from the hybrid pressure switch.

In an embodiment, the mechanical pressure switch switches with a switching pressure comprising a rising pressure or a falling pressure.

In an embodiment, a hand wheel can be used for adjusting the switching pressure.

In an embodiment, the mechanical pressure switch can comprise a micro-switch, wherein when the single switching point is attained, the micro-switch can be actuated and functions as a change-over contact.

In an embodiment, an electronic measuring system can output a measured pressure scaled to an output signal in a range of 4 mA-20 mA.

In an embodiment, the electronic measuring system can output the measured pressure via a bus system.

In an embodiment, a pressure sensor apparatus, can include a hybrid pressure switch having a single switching point and a housing, wherein the hybrid pressure switch is located within the housing, the hybrid pressure switch including: a mechanical pressure switch and an electronic pressure sensor, wherein the hybrid pressure switch monitors a media pressure with the mechanical pressure switch providing a switching function and the electronic pressure sensor providing a continuous pressure measurement with respect to the media pressure based on a continuous pressure output signal, wherein the switching function comprises: a fail-safe switching function or a non-fail-safe switching function.

In an embodiment, a method of operating a pressure sensor apparatus can involve steps or operations for: operating a hybrid pressure switch with a single switching point, the hybrid pressure switch comprising a mechanical pressure switch and an electronic pressure sensor, and monitoring a media pressure with the hybrid pressure switch with the mechanical pressure switch providing a switching function and the electronic pressure sensor providing a continuous pressure measurement with respect to the media pressure based on a continuous pressure output signal, wherein the switching function comprises: a fail-safe switching function or a non-fail-safe switching function.

An embodiment of the method can further involve a step or operation for outputting the continuous pressure output signal from the hybrid pressure switch.

An embodiment of the method can further involve a step or operation for switching the mechanical pressure switch with a switching pressure comprising a rising pressure or a falling pressure.

In an embodiment of the method, the mechanical pressure switch can comprise a micro-switch, wherein when the single switching point is attained, a step or operation can be implemented for actuating the micro-switch as a change-over contact.

An embodiment of the method can further involves steps or operations for outputting a measured pressure scaled to an output signal in a range of 4 mA-20 mA, or outputting the measured pressure via a bus system.

BRIEF DESCRIPTION OF THE DRAWINGS

The accompanying figures, in which like reference numerals refer to identical or functionally-similar elements throughout the separate views and which are incorporated in and form a part of the specification, further illustrate the present invention and, together with the detailed description of the invention, serve to explain the principles of the present invention.

DETAILED DESCRIPTION

The particular values and configurations discussed in these non-limiting examples can be varied and are cited merely to illustrate one or more embodiments and are not intended to limit the scope thereof.

Subject matter will now be described more fully hereinafter with reference to the accompanying drawings, which form a part hereof, and which show, by way of illustration, specific example embodiments. Subject matter may, however, be embodied in a variety of different forms and, therefore, covered or claimed subject matter is intended to be construed as not being limited to any example embodiments set forth herein; example embodiments are provided merely to be illustrative. Likewise, a reasonably broad scope for claimed or covered subject matter is intended. Among other issues, subject matter may be embodied as methods, devices, components, or systems. Accordingly, embodiments may, for example, take the form of hardware, software, firmware, or a combination thereof. The following detailed description is, therefore, not intended to be interpreted in a limiting sense.

Throughout the specification and claims, terms may have nuanced meanings suggested or implied in context beyond an explicitly stated meaning. Likewise, phrases such as "in one embodiment" or "in an example embodiment" and variations thereof as utilized herein may not necessarily refer to the same embodiment and the phrase "in another embodiment" or "in another example embodiment" and variations thereof as utilized herein may or may not necessarily refer to a different embodiment. It is intended, for example, that claimed subject matter include combinations of example embodiments in whole or in part.

In general, terminology may be understood, at least in part, from usage in context. For example, terms such as "and," "or," or "and/or" as used herein may include a variety of meanings that may depend, at least in part, upon the context in which such terms are used. Generally, "or" if used to associate a list, such as A, B, or C, is intended to mean A, B, and C, here used in the inclusive sense, as well as A, B, or C, here used in the exclusive sense. In addition, the term "one or more" as used herein, depending at least in part upon context, may be used to describe any feature, structure, or characteristic in a singular sense or may be used to describe combinations of features, structures, or characteristics in a plural sense. Similarly, terms such as "a," "an," or "the", again, may be understood to convey a singular usage or to convey a plural usage, depending at least in part upon context. In addition, the term "based on" may be understood as not necessarily intended to convey an exclusive set of factors and may, instead, allow for existence of additional factors not necessarily expressly described, again, depending at least in part on context.

Figure 1:
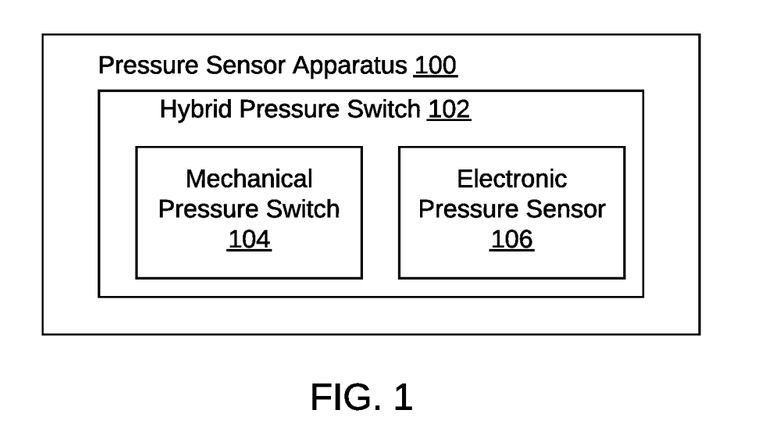
FIG. 1 illustrates a block diagram of a pressure sensor apparatus, in accordance with an embodiment.

FIG. 1 illustrates a block diagram of a pressure sensor apparatus 100, in accordance with an embodiment. The pressure sensor apparatus 100 shown in FIG. 1 can be utilized for sensing a pressure of a media such as a gas or a liquid. In a preferred embodiment, however, the media is likely to be gas. The pressure sensor apparatus 100 can include a hybrid pressure switch 102 that operates with a single switching point. The hybrid pressure switch 102 can include a mechanical pressure switch 104 and an electronic pressure sensor 106.

The mechanical pressure switch 104 can monitor the pressure of liquid or gaseous media and close or open an electrical circuit on reaching a set threshold. The electronic pressures sensor 106 can also be used to pressure measurement of liquid or gaseous media. The electronic pressures sensor 106, however, may act as a transducer, and can generate a signal as a function of the pressure imposed. In the case of electronic pressures sensor 106, the signal is electrical. Such a signal can be a continuous pressure output signal.

The hybrid pressure switch 102 can monitor a media pressure with the mechanical pressure switch 104 to provide a switching function, and the electronic pressure sensor 106 can provide a continuous pressure measurement with respect to the media pressure based on a continuous pressure output signal.

The hybrid pressure switch 102 can function as a gas pressure switch that operates has one switching point and with one or more pressure sensors (e.g., mechanical pressure switch 104, electronic pressure sensor 106, etc) within a housing (e.g., see housing 109 in FIG. 5) to provide a single device with two or more sensor functionalities. One function can be, for example, a fail-safe switching function facilitated by the mechanical pressure switch 104, and the other function may be the generation of a non-safety continuous output signal from the electronic pressure sensor 106.

The pressure sensor apparatus 100 can be preferably used for pressure monitoring applications. As discussed previously, a pressure switch can be employed to interrupt the safety signal of the higher-level control when a set pressure value is exceeded or not reached. This interruption can result in the immediate termination and switching off of, for example, a process engineering environment or facility being monitored by a pressure switch. In an abrupt shutdown, however, the process material may be discarded and the process may need to be restarted, which can be time-consuming and expensive.

In order to avoid a process interruption due to pressure fluctuations, continuous measurement of the media pressure by the electronic pressure sensor 106 is advantageous. A possible drop or increase in media pressure can be diagnosed early and countermeasures can be initiated (e.g., by increasing or decreasing the pressure). These two principles are now combined in a hybrid device (i.e., the hybrid pressure switch 102) in order to implement both system advantages.

Compared to conventional arrangements involving a separate mechanical pressure switch and a separate electronic pressure sensor, the embodiments offer the advantage that only one media connection may be required, with the electrical installation taking place at one point. This design is also more cost-effective and more compact than conventional approaches.

Figure 2:
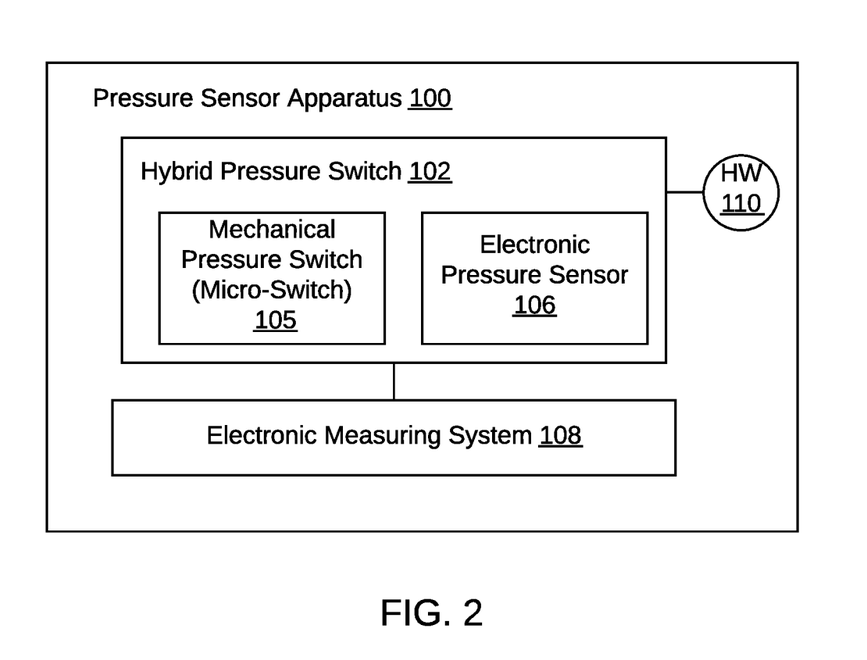
FIG. 2 illustrates a block diagram of a pressure sensor apparatus, in accordance with an alternative embodiment

FIG. 2 illustrates a block diagram of a pressure sensor apparatus 100, in accordance with an alternative embodiment. Note that in the figures illustrated and described herein, identical or similar parts or elements are generally indicated by identical reference numerals. Thus, the embodiment of the pressure sensor apparatus 100 shown in FIG. 2 is similar to the embodiment depicted in FIG. 1 with the difference that an electronic measuring system 108 is shown, which can communicate with the hybrid pressure switch 102.

The mechanical pressure switch 104 can switch with rising or falling pressure. When the set switching point is reached, a micro switch can be actuated which can be designed as a change-over contact. That is, the mechanical pressure switch 104 depicted in FIG. 1 can be implemented as a micro switch 105 as shown in FIG. 2. In some embodiments, the switching pressure can be adjusted with a handwheel (HW) such as the handwheel 110 shown in FIG. 2. Note that a non-limiting example of a handwheel, which can be adapted for use in accordance with one or more embodiments, is the type of handwheel used with the Honeywell C6097 pressure switch. Other types of handwheel devices may also be used to implement the handwheel 110 depicted in FIG. 2. In some embodiments, the handwheel 110 may function with and/or may be integrated with the mechanical pressure switch 104.

The electronic measuring system 108 can output the measured pressure scaled to, for example, a 4 mA-20 mA output signal or via a bus system. The output can be failsafe or non-failsafe. Note that the terms 'failsafe' and 'fail-safe' as utilized herein can relate to causing a piece of machinery or other mechanism to revert to a safe condition in the event of a breakdown or malfunction. The terms 'failsafe' and 'fail-safe' can also relate to a system or plan that comes into operation in the event of something going wrong or that is there to prevent such an occurrence. The terms 'non-failsafe' and 'non-fail-safe', on the other hand, can relate to a safety system or safety technique where there remains the possibility of dangerous failures.

Figure 3:
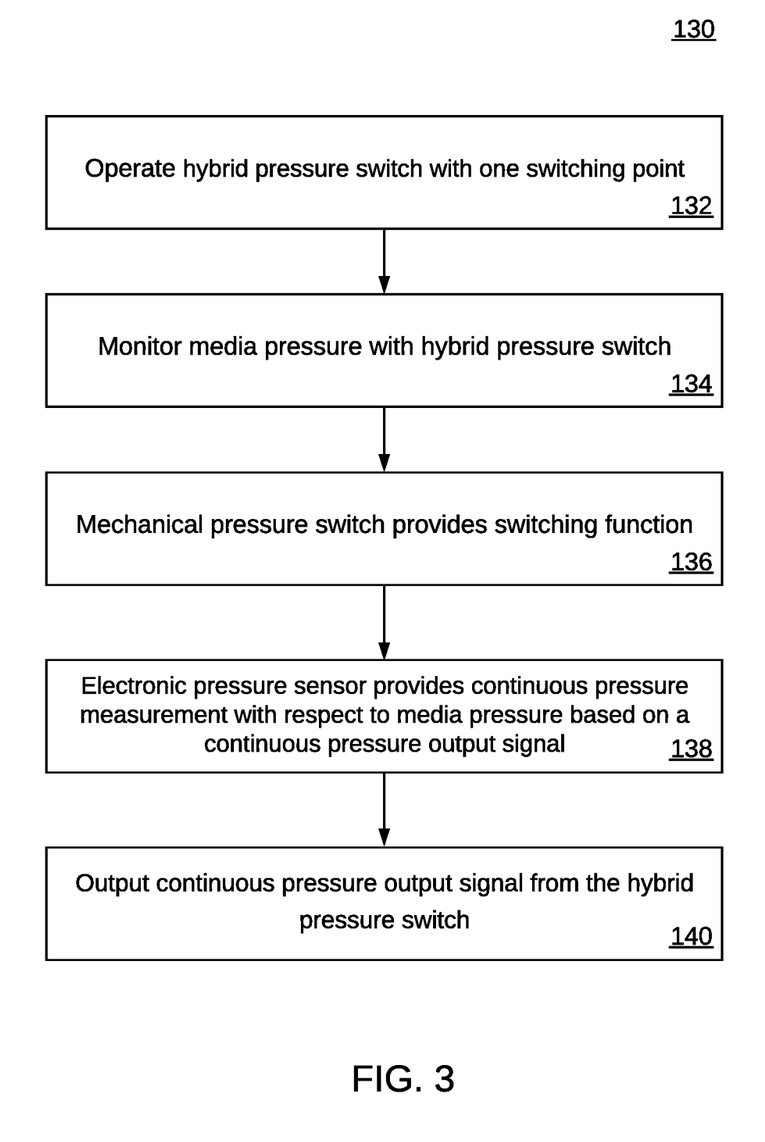
FIG. 3 illustrates a flow chart of operations depicting logical operational steps of a method of operating a pressure sensor apparatus, in accordance with an embodiment.

FIG. 3 illustrates a flow chart of operations depicting logical operational steps of a method 130 for operating the pressure sensor apparatus 100, in accordance with an embodiment. As discussed previously, the pressure sensor apparatus 100 can include the hybrid pressure switch 102, which can include the mechanical pressure switch 104 and the electronic pressure sensor 106. The method 130 shown in FIG. 3 can include a number of steps or operations, such as, for example, operating the hybrid pressure switch 102 with one switching point, as depicted at block 132.

Thereafter, as shown at block 134, a step or operation can be implemented for monitoring media pressure with the hybrid pressure switch 102. As depicted at block 136, the mechanical pressure switch 104 can provide the switching function, and as shown at block 138, the electronic pressure sensor 106 can provide a continuous pressure measurement with respect to the media pressure based on a continuous pressure output signal. As illustrated at block 140, a step or operation can be implemented for outputting the continuous pressure output signal from the hybrid pressure switch 102.

Figure 4:
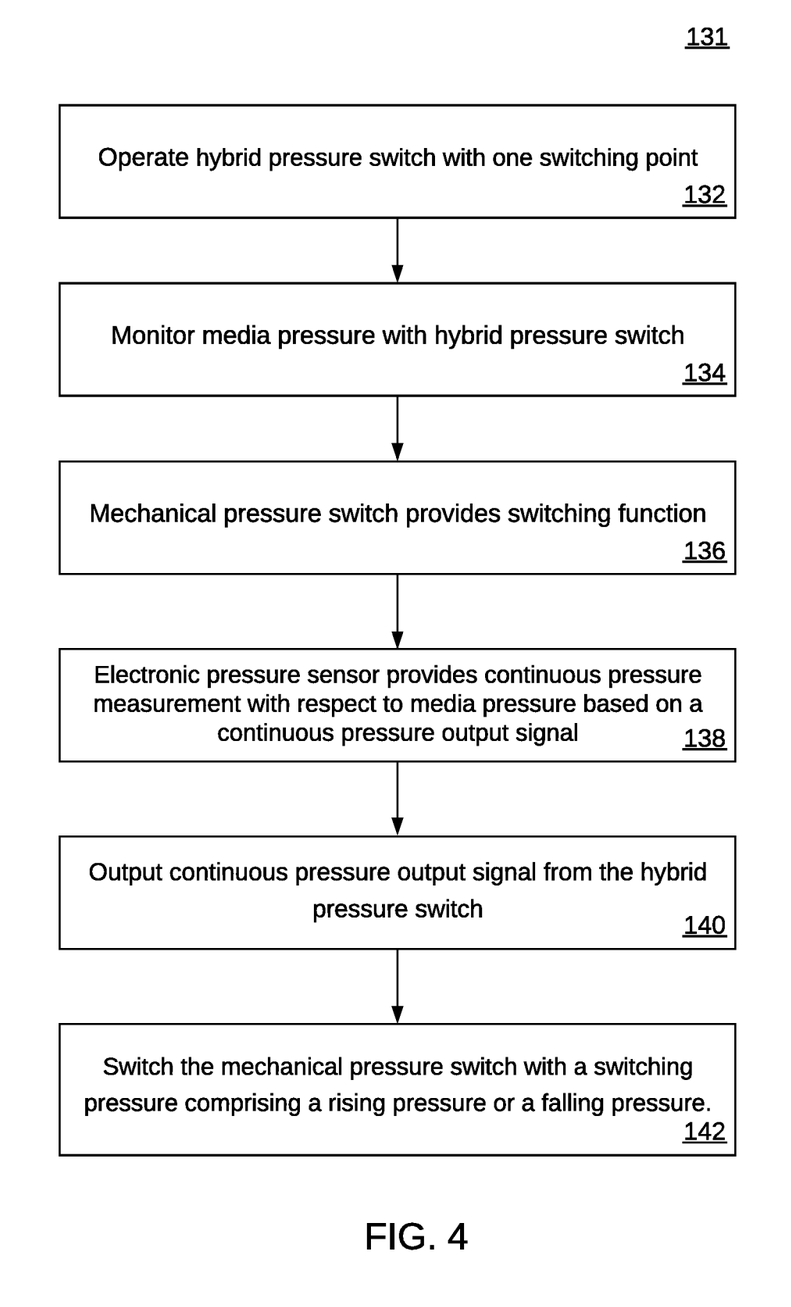
FIG. 4 illustrates a flow chart of operations depicting logical operational steps of a method of operating a pressure sensor apparatus, in accordance with an alternative embodiment.

FIG. 4 illustrates a flow chart of operations depicting logical operational steps of method 131 of operating the pressure sensor apparatus 100, in accordance with an alternative embodiment. The method 131 depicted in FIG. 4 is similar to the method 130 shown in FIG. 3, but with some differences. For example, an additional step or operation is shown in FIG. 4, as indicated at block 142, which involves the mechanical pressure switch switching with a switching pressure comprising a rising pressure or a falling pressure.

Figure 5:
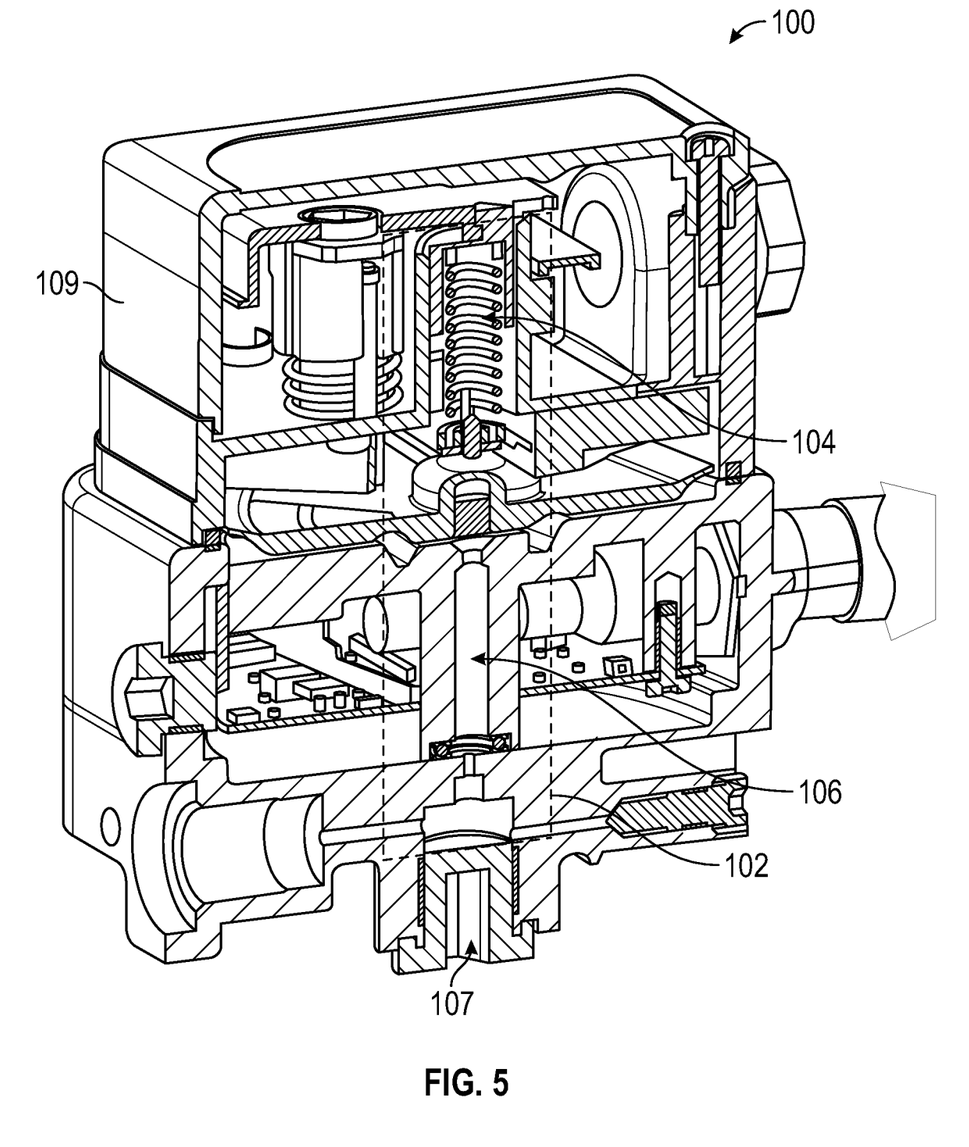
FIG. 5 illustrates a perspective view of a pressure sensor apparatus, in accordance with an embodiment.

FIG. 5 illustrates a perspective view of the pressure sensor apparatus 100, in accordance with an embodiment. The pressure sensor apparatus 100 depicted in FIG. 5 includes the hybrid pressure switch 102, which as discussed previously can operate with one switching point. The hybrid pressure switch 102 is shown in FIG. 5 as including the mechanical pressure switch 104 and the electronic pressure sensor 106. The hybrid pressure switch 102 monitors media pressure with the mechanical pressure switch 104 to provide the previously switching function. The electronic pressure sensor 106 can provide a continuous pressure measurement with respect to the media pressure based on a continuous pressure output signal.

The hybrid pressure switch 102 thus operate as a gas pressure switch that functions with a single switching point and with the mechanical pressure switch 104 and the electronic pressure sensor 106 located within the housing 109, thereby providing a single device with two or more sensor functionalities as discussed previously. The housing 109 can help isolate the hybrid pressure switch 102 and associate sensor components from media in harsh environments, for example, such as in which the media may freeze.

The pressure sensor apparatus 100 also includes a central gas input 107 through which gas (e.g. media comprising gas) flows and comes into contact with the hybrid pressure switch 102 including the mechanical pressure switch 104 and the electronic pressure sensor 106.

Although the operations of the apparatus(s) and method(s) herein are shown and described in a particular order, the order of the operations of each method the disclosed devices may be altered so that certain operations may be performed in an inverse order or so that certain operations may be performed, at least in part, concurrently with other operations. In another embodiment, instructions or sub-operations of distinct operations may be implemented in an intermittent and/or alternating manner.

It should also be noted that at least some of the steps or operations of the devices, apparatuses and methods described herein may be implemented using software instructions stored on a computer useable storage medium for execution by a computer including, for example, a microcontroller as discussed herein. As an example, an embodiment of a computer program product can include a computer useable storage medium to store a computer readable program.

The computer-useable or computer-readable storage medium can be an electronic, magnetic, optical, electromagnetic, infrared, or semiconductor system (or apparatus or device). Examples of non-transitory computer-useable and computer-readable storage media include a semiconductor or solid-state memory, magnetic tape, a removable computer diskette, a random access memory (RAM), a read-only memory (ROM), a rigid magnetic disk, and an optical disk. Current examples of optical disks include a compact disk with read only memory (CD-ROM), a compact disk with read/write (CD-R/W), a digital video disk (DVD), Flash memory, and so on.

Alternatively, embodiments may be implemented entirely in hardware or in an implementation containing both hardware and software elements. In embodiments that do utilize software, the software may include but is not limited to firmware, resident software, microcode, etc. Example implementations of the embodiments can include a hardware device with some embedded software for measuring/detecting and transmitting data (e.g. temperature, pressure, motion). Other example implementations of the embodiments may include embedded software that runs in a device/unit (e.g., firmware).

In some alternative implementations, the functions noted in the blocks may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Based on the foregoing, it can be appreciated that a number of embodiments including preferred and alternative embodiments, are disclosed herein. For example, in one embodiment a pressure sensor apparatus can include a hybrid pressure switch having a single switching point, the hybrid pressure switch comprising: a mechanical pressure switch; and an electronic pressure sensor, wherein the hybrid pressure switch monitors a media pressure with the mechanical pressure switch providing a switching function and the electronic pressure sensor providing a continuous pressure measurement with respect to the media pressure based on a continuous pressure output signal.

In an embodiment, the switching function can comprise a fail-safe switching function or a non-fail-safe switching function.

In an embodiment, a housing can be provided with the hybrid pressure switch located within the housing.

In an embodiment, the continuous pressure output signal can be output from the hybrid pressure switch.

In an embodiment, the mechanical pressure switch switches with a switching pressure comprising a rising pressure or a falling pressure.

In an embodiment, a hand wheel can be used for adjusting the switching pressure.

In an embodiment, the mechanical pressure switch can comprise a micro-switch, wherein when the single switching point is attained, the micro-switch can be actuated and functions as a change-over contact.

In an embodiment, an electronic measuring system can output a measured pressure scaled to an output signal in a range of 4 mA-20 mA.

In an embodiment, the electronic measuring system can output the measured pressure via a bus system.

In another embodiment, a pressure sensor apparatus, can include a hybrid pressure switch having a single switching point and a housing, wherein the hybrid pressure switch is located within the housing, the hybrid pressure switch including: a mechanical pressure switch and an electronic pressure sensor, wherein the hybrid pressure switch monitors a media pressure with the mechanical pressure switch providing a switching function and the electronic pressure sensor providing a continuous pressure measurement with respect to the media pressure based on a continuous pressure output signal, wherein the switching function comprises: a fail-safe switching function or a non-fail-safe switching function.

In yet another embodiment, a method of operating a pressure sensor apparatus can involve steps or operations for: operating a hybrid pressure switch with a single switching point, the hybrid pressure switch comprising a mechanical pressure switch and an electronic pressure sensor, and monitoring a media pressure with the hybrid pressure switch with the mechanical pressure switch providing a switching function and the electronic pressure sensor providing a continuous pressure measurement with respect to the media pressure based on a continuous pressure output signal, wherein the switching function comprises: a fail-safe switching function or a non-fail-safe switching function.

An embodiment of the method can further involve a step or operation for outputting the continuous pressure output signal from the hybrid pressure switch.

An embodiment of the method can further involve a step or operation for switching the mechanical pressure switch with a switching pressure comprising a rising pressure or a falling pressure.

In an embodiment of the method, the mechanical pressure switch can comprise a micro-switch, wherein when the single switching point is attained, a step or operation can be implemented for actuating the micro-switch as a change-over contact.

An embodiment of the method can further involves steps or operations for outputting a measured pressure scaled to an output signal in a range of 4 mA-20 mA, or outputting the measured pressure via a bus system.

It will be appreciated that variations of the above-disclosed embodiments and examples and other features and functions, or alternatives thereof, may be desirably combined into many other different systems or applications. It will also be appreciated that various presently unforeseen or unanticipated alternatives, modifications, variations or improvements therein may be subsequently made by those skilled in the art which are also intended to be encompassed by the following claims.

What is claimed is:

1. A pressure sensor apparatus, comprising:
  a hybrid pressure switch provides a single switching point, the hybrid pressure switch comprising:
   a mechanical pressure switch; and
   an electronic pressure sensor, wherein the hybrid pressure switch monitors a media pressure with the mechanical pressure switch providing a switching function and the electronic pressure sensor providing a continuous pressure measurement with respect to the media pressure based on a continuous pressure output signal,
  wherein the mechanical pressure switch comprises a micro-switch, wherein when the single switching point is attained, the micro-switch is actuated and functions as a change-over contact.

2. The pressure sensor apparatus of claim 1 wherein the switching function comprises: a fail-safe switching function or a non-fail-safe switching function.

3. The pressure sensor apparatus of claim 1 further comprising a housing, wherein the hybrid pressure switch is located within the housing.

4. The pressure sensor apparatus of claim 1 wherein the continuous pressure output signal is output from the hybrid pressure switch.

5. The pressure sensor apparatus of claim 1 wherein the mechanical pressure switch switches with a switching pressure comprising a rising pressure or a falling pressure.

6. The pressure sensor apparatus of claim 1 further comprising a hand wheel for adjusting the switching pressure.

7. The pressure sensor apparatus of claim 1 further comprising an electronic measuring system that outputs a measured pressure scaled to an output signal in a range of 4 mA-20 mA.

8. The pressure sensor apparatus of claim 1 further comprising an electronic measuring system that outputs a measured pressure via a bus system.

9. A pressure sensor apparatus, comprising:
a hybrid pressure switch provides a single switching point; and
a housing, wherein the hybrid pressure switch is located within the housing, the hybrid pressure switch including:
a mechanical pressure switch; and
an electronic pressure sensor, wherein the hybrid pressure switch monitors a media pressure with the mechanical pressure switch providing a switching function and the electronic pressure sensor providing a continuous pressure measurement with respect to the media pressure based on a continuous pressure output signal, wherein the switching function comprises: a fail-safe switching function or a non-fail-safe switching function,
wherein the mechanical pressure switch comprises a micro-switch, wherein when the single switching point is attained, the micro-switch is actuated and functions as a change-over contact.

10. The pressure sensor apparatus of claim 9 wherein the continuous pressure output signal is output from the hybrid pressure switch.

11. The pressure sensor apparatus of claim 9 wherein the mechanical pressure switch switches with a switching pressure comprising a rising pressure or a falling pressure.

12. The pressure sensor apparatus of claim 9 further comprising an electronic measuring system that outputs a measured pressure scaled to an output signal in a range of 4 mA-20 mA.

13. The pressure sensor apparatus of claim 9 further comprising an electronic measuring system that outputs a measured pressure via a bus system.

14. A method of operating a pressure sensor apparatus, comprising:
operating a hybrid pressure switch with a single switching point, the hybrid pressure switch comprising a mechanical pressure switch and an electronic pressure sensor; and
monitoring a media pressure with the hybrid pressure switch with the mechanical pressure switch providing a switching function and the electronic pressure sensor providing a continuous pressure measurement with respect to the media pressure based on a continuous pressure output signal, wherein the switching function comprises: a fail-safe switching function or a non-fail-safe switching function,
wherein the mechanical pressure switch comprises a micro-switch, and when the single switching point is attained, actuating the micro-switch as a change-over contact.

15. The method of claim 14 further comprising outputting the continuous pressure output signal from the hybrid pressure switch.

16. The method of claim 14 further comprising switching the mechanical pressure switch with a switching pressure comprising a rising pressure or a falling pressure.

17. The method of claim 14 further comprising:
outputting a measured pressure scaled to an output signal in a range of 4 mA-20 mA; or
outputting the measured pressure via a bus system.

18. The method of claim 14 further comprising outputting a measured pressure scaled to an output signal in a range of 4 mA-20 mA.

19. The method of claim 14 further comprising outputting the measured pressure via a bus system.

20. The method of claim 17 further comprising switching the mechanical pressure switch with a switching pressure comprising a rising pressure or a falling pressure.

* * * * *